United States Patent
Zhang

(10) Patent No.: US 9,006,979 B2
(45) Date of Patent: Apr. 14, 2015

(54) PROTECTION CIRCUIT WITH LOW ENERGY-CONSUMPTION AND DRIVING CIRCUIT THEREOF

(71) Applicant: Shenzhen China Star Optoelectronics Technology Co., Ltd., Shenzhen, Guangdong (CN)

(72) Inventor: Hua Zhang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/000,621

(22) PCT Filed: Jun. 25, 2013

(86) PCT No.: PCT/CN2013/077908
§ 371 (c)(1),
(2) Date: Aug. 21, 2013

(87) PCT Pub. No.: WO2014/187002
PCT Pub. Date: Nov. 27, 2014

(65) Prior Publication Data
US 2014/0346955 A1   Nov. 27, 2014

(51) Int. Cl.
*H05B 33/08*  (2006.01)
*H02H 7/00*  (2006.01)

(52) U.S. Cl.
CPC ............. *H05B 33/083* (2013.01); *H02H 7/00* (2013.01); *Y02B 20/42* (2013.01)

(58) Field of Classification Search
CPC ........ H05B 37/00; H05B 37/02; H05B 33/00; H05B 33/02; H05B 33/08; H05B 33/0803; H05B 33/0806; H05B 33/0809; H05B 33/083; H05B 33/0851; H05B 33/0866; H05B 33/0884
USPC ............. 315/185 R, 186, 193, 307, 308, 291, 315/224, 225, 119, 121, 122, 123, 125; 345/204; 361/115
See application file for complete search history.

(56) References Cited

U.S. PATENT DOCUMENTS

2012/0287097 A1* 11/2012 Akiyama et al. ............... 345/204
2012/0313545 A1* 12/2012 Courtel .......................... 315/250

* cited by examiner

*Primary Examiner* — David H Vu
(74) *Attorney, Agent, or Firm* — Andrew C. Cheng

(57) ABSTRACT

The present invention provides a protection circuit with low energy-consumption and a driving circuit thereof. The protection circuit includes a detection circuit and a switch circuit. The switch circuit is disposed between a power supply circuit and a peripheral step-down shunt. The detection circuit and the switch circuit are connected for controlling. The switch circuit includes a PNP triode or a P MOS transistor connected between the power supply circuit and the peripheral step-down shunt. A base of the PNP triode or the P MOS transistor is connected to a drain of another N MOS transistor through a resistor, and a gate of the N MOS transistor is connected to a status pin of the detection circuit. The present invention solves drawbacks of existent input voltage after the circuit entering a protection state causing unnecessary energy-consumption in peripheral small-signal circuit and voltage-dividing resistors.

16 Claims, 1 Drawing Sheet

PROTECTION CIRCUIT WITH LOW ENERGY-CONSUMPTION AND DRIVING CIRCUIT THEREOF

BACKGROUND OF THE INVENTION

1. Field of the Invention

The present invention relates to the field of automatic adjustment system for adjusting electrical variable techniques, more specifically to a circuit for reducing energy-consumption in protection state, and in particular to a protection circuit with low energy-consumption and driving circuit thereof.

2. The Related Arts

The known LED backlight driving circuit is shown in FIG. 1. When a detection circuit (LED constant-current driving IC) detects abnormal current and voltage in the LED string, a protection mechanism will be activated to stop outputting driving signals to the MOS transistor Q1. The MOS transistor Q1 is then in the turned off state so that the entire circuit loses the boosting function. At this point, the output voltage equals to the input voltage and the LED string is turned off because of insufficient voltage. However, even the entire circuit is in a protection state and the LED string is turned off, the input voltage still exists, which leads to energy-consumption in peripheral small-signal circuit and voltage-dividing resistors and causes unnecessary consumption drawback.

China Application No. 201210317379.X and Publication No. CN 102842893A, titled "LED light bar short-circuit protection control circuit," disclosed an LED light bar short-circuit protection control circuit, comprising an LED constant-current sampling control circuit, connected in the power supply loop of the LED light bar to realize constant-current control; a switch circuit, connected in the power supply loop of the LED light bar and disposed between the LED light bar and power supply, with control terminal of the switch circuit connected to the backlight control signal; an LED short-circuit protection circuit, connected between the LED constant-current sampling control circuit and the control terminal of the switch circuit, and comprising: a comparator, with non-inverting input terminal connected to the LED constant-current sampling control circuit and inverting input terminal connected to a default threshold signal, when the signal at the non-inverting input terminal of the comparator has a greater value than the signal at the default threshold signal, the LED short-circuit protection circuit outputting a control signal to the control terminal of the switch circuit and the switch circuit cutting off the power supply to the LED light bar. Although the LED light bar short-circuit protection control circuit can perform detection and protection control on the LED short-circuit behavior, the protection control circuit achieves the objective by employing the mechanism of cutting off the entire power supply to the LED light bar. The mechanism is equivalent to the effect that during the short-circuit protection control process, the power supply to the overall circuit must be cut off and turned on again, which leads to response delay of the overall power supply circuit and reduces the lifespan of the components of the circuit, and causes the drawbacks of low efficiency and effects of the overall circuit.

China Application No. ZL200820301509.X and Publication No. CN 201229514Y, titled "low energy-consumption circuit of series regulator and overcurrent protection," disclosed a low energy-consumption circuit of series regulator and overcurrent protection, comprising an adjustment circuit and a current sampling circuit. The adjustment circuit and the current sampling circuit are serially connected between the input terminal and the output terminal. The one end of the current sampling circuit connected to the output terminal is connected to the common terminal through the output voltage sampling circuit. The sampling voltage of the adjustment circuit is connected to the inverting input terminal of the comparator circuit and the non-inverting input terminal of the comparator circuit is connected to the output voltage sampling circuit. The output terminal of the comparator circuit is connected to the control terminal of the adjustment circuit. The sampling voltage of the output voltage sampling circuit is connected to the control terminal of the adjustment circuit. The negative terminal of the adjustment circuit is connected to the common terminal and the positive terminal of the adjustment circuit is connected to the control terminal of the adjustment circuit. The two ends of the adjustment circuit are connected to activation circuit. The control terminal of the adjustment circuit is connected to an over-bias power supply through an over-bias current-limiting circuit. Although the disclosed circuit can achieve the object of controlling output current in the case of over-current or short-circuit, the problem solved by the disclosed circuit is to enable long-term operation in case of short-circuit and automatic restoring power supply after the short-circuit or over-current situation is eliminated. In addition, the disclosed circuit is still to dispose adjustment circuit in the overall circuit structure, and the aforementioned drawbacks of response delay of the overall power supply circuit and reducing lifespan of the components of the circuit, as well as causing the drawbacks of low efficiency and effects of the overall circuit remain.

In summary, the known protection circuit for over-current or short-circuit with low energy-consumption, when applied to the current LED circuit, is mostly disposing adjustment circuit or control switch circuit in the overall circuit structure, which only realizes limited function of performing short-circuit detection and protection control on LED, without completely solve the drawbacks of response delay of the overall power supply circuit and reducing lifespan of the components of the circuit, as well as causing the drawbacks of low efficiency and effects of the overall circuit.

SUMMARY OF THE INVENTION

The technical issue to be addressed by the present invention is to provide a protection circuit with low energy-consumption and driving circuit thereof, to solve the drawbacks of the existence of input voltage even after the overall circuit entering a protection state due to abnormal behavior, which leads to energy-consumption in peripheral small-signal circuit and voltage-dividing resistors and causes unnecessary consumption. Also, the present invention can overcome the drawbacks of known low energy-consumption protection circuit for over-current or short-circuit, such as, complex circuitry, response delay in the overall power supply circuit and reduced lifespan.

The present invention provides a protection circuit with low energy-consumption, which comprises: a detection circuit and a switch circuit, wherein the switch circuit being disposed between a power supply circuit and peripheral step-down shunt; the detection circuit and the switch circuit being connected for controlling.

According to a preferred embodiment of the present invention, the switch circuit comprises a PNP triode connected between the power supply circuit and peripheral step-down shunt; wherein the base of the PNP triode being connected to drain of another N MOS transistor through a resistor, the gate of the N MOS transistor being connected to a status pin of the detection circuit.

According to a preferred embodiment of the present invention, the switch circuit comprises a P MOS transistor connected between the power supply circuit and peripheral step-down shunt; wherein the base of the P MOS transistor being connected to drain of another N MOS transistor through a resistor, the gate of the N MOS transistor being connected to a status pin of the detection circuit.

According to a preferred embodiment of the present invention, the detection circuit employs a driving IC.

According to a preferred embodiment of the present invention, the driving IC is a constant-current driving IC.

According to a preferred embodiment of the present invention, the constant-current driving IC is an LED constant-current driving IC.

According to a preferred embodiment of the present invention, the peripheral step-down shunt is a small-signal control circuit and/or inductor and/or a divider resistor.

The present invention provides a driving circuit, which comprises: an IC having pins, wherein the driving circuit comprising a protection circuit with low energy-consumption, which further comprising: a detection circuit and a switch circuit, wherein the switch circuit being disposed between a power supply circuit and peripheral step-down shunt; the detection circuit and the switch circuit being connected for controlling.

According to a preferred embodiment of the present invention, the switch circuit comprises a PNP triode connected between the power supply circuit and peripheral step-down shunt; wherein the base of the PNP triode being connected to drain of another N MOS transistor through a resistor, the gate of the N MOS transistor being connected to a status pin of the detection circuit.

According to a preferred embodiment of the present invention, the switch circuit comprises a P MOS transistor connected between the power supply circuit and peripheral step-down shunt; wherein the base of the P MOS transistor being connected to drain of another N MOS transistor through a resistor, the gate of the N MOS transistor being connected to a status pin of the detection circuit.

According to a preferred embodiment of the present invention, the detection circuit employs a driving IC.

According to a preferred embodiment of the present invention, the driving IC is a constant-current driving IC.

According to a preferred embodiment of the present invention, the constant-current driving IC is an LED constant-current driving IC.

According to a preferred embodiment of the present invention, the peripheral step-down shunt is a small-signal control circuit and/or inductor and/or a divider resistor.

Compared to the known technology, the preset invention has the following advantages.

The present invention provides a protection circuit with low energy-consumption. By disposing a switch circuit between a power supply circuit and peripheral step-down shunt and connection between the detection circuit and the switch circuit for controlling and appropriate disposition of the switch circuit, the present invention can stably and effectively reduce the energy-consumption of the circuit in protection state, as well as without affecting the response time and lifespan of the overall circuit when the circuit is reactivated again.

The present invention further provides a driving circuit, employing the aforementioned protection circuit with low energy-consumption. When the circuit behaves abnormally, the input power supply voltage is cut off from the peripheral step-down shunt to reduce energy-consumption, as well as without affecting the response time and lifespan of the overall circuit when the circuit is reactivated again.

In summary, the present invention provides a protection circuit with low energy-consumption and driving circuit thereof to solve the drawbacks of the existence of input voltage even after the overall circuit entering a protection state due to abnormal behavior, which leads to energy-consumption in peripheral small-signal circuit and voltage-dividing resistors and causes unnecessary consumption. Also, the present invention can overcome the drawbacks of known low energy-consumption protection circuit for over-current or short-circuit, such as, complex circuitry, response delay in the overall power supply circuit and reduced lifespan. When the circuit behaves abnormally, the input power supply voltage is cut off from the peripheral step-down shunt to reduce energy-consumption, as well as following advantages: simple circuitry, reliable and stable consumption reduction result, without affecting the response time and lifespan of the overall circuit when the circuit reactivated again, easy control and high safety.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following refers to drawings and embodiments to describe the present invention in details.

Figure 1:
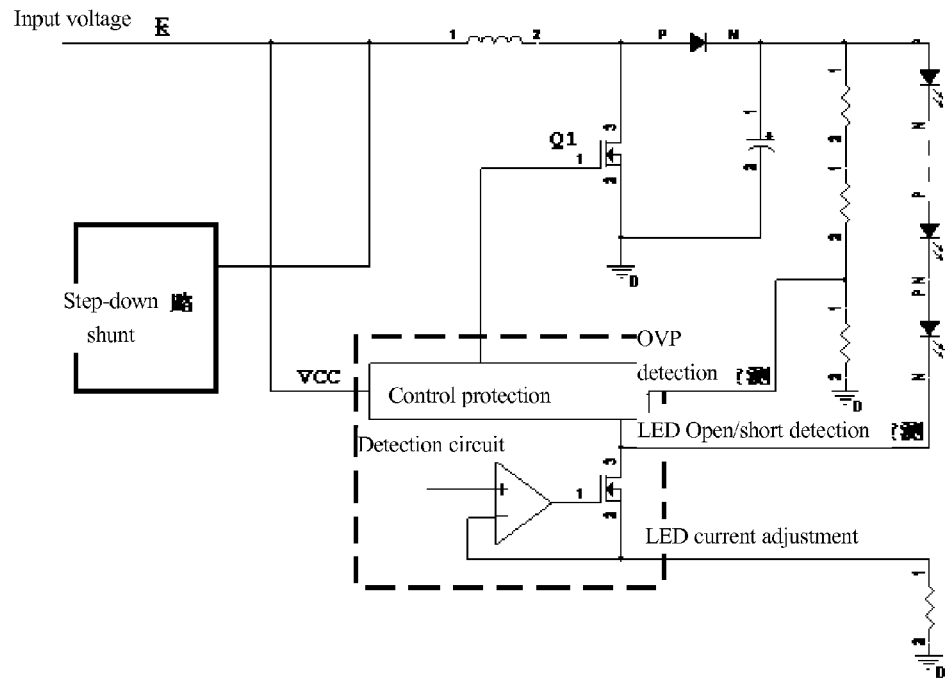
FIG. 1 is a schematic view showing the structure of a known LED backlight driving circuit.
Figure 2:
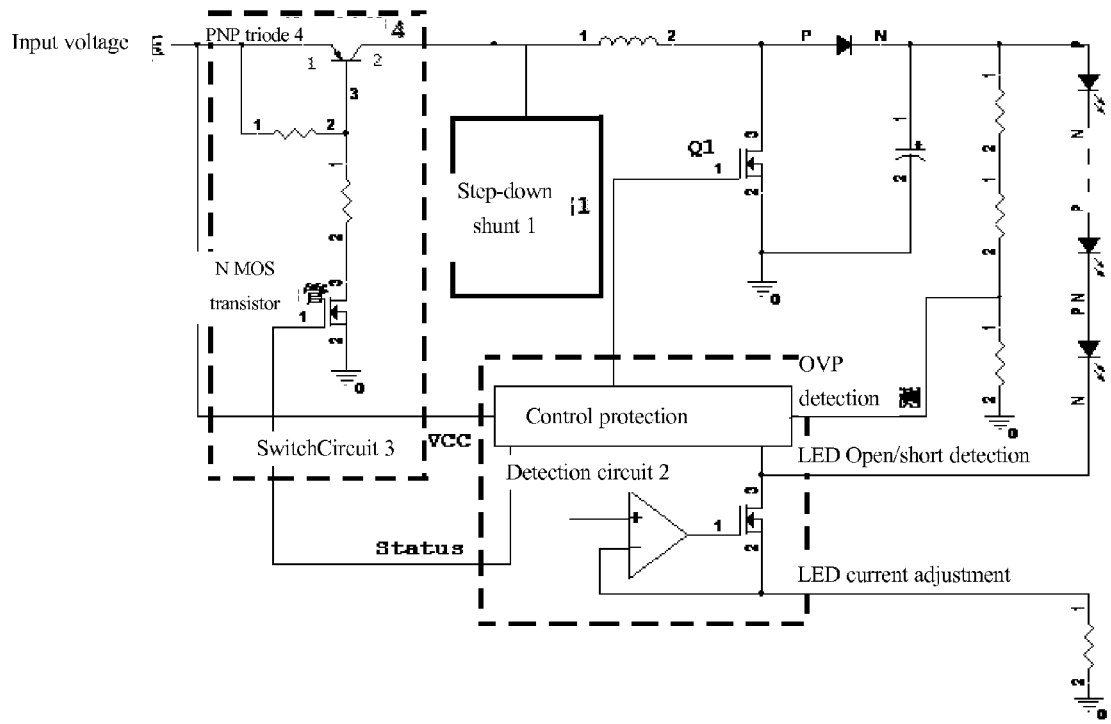
FIG. 2 is a schematic view showing the structure of an LED backlight driving circuit having the protection circuit with low energy-consumption according to the present invention, wherein 1 is step-down shunt, 2 is detection circuit, 3 is switch circuit and 4 is PNP triode.

As shown in FIG. 2, the protection circuit with low energy-consumption, comprising: a detection circuit 2 employing LED constant-current driving IC and a switch circuit 3. The switch circuit is disposed between the power supply circuit and peripheral step-down shunt 1. The step-down shunt 1 is a small-signal control circuit, and the detection circuit 2 and switch circuit 3 are connected for controlling purpose. The switch circuit 3 comprises a PNP triode 4 connected between the power supply circuit and peripheral step-down shunt 1; wherein the base of the PNP triode 4 is connected to drain of another N MOS transistor through a resistor, the gate of the N MOS transistor is connected to a status pin of the detection circuit.

When the LED constant-current driving IC detects a abnormal behavior, the voltage on the status pin will invert from the high voltage level indicating normal operating to a low voltage level to indicate that the protection function has been activated. The PNP triode 4 (or a P MOS transistor) is connected between the power supply circuit and peripheral step-down shunt 1 of inductor, divider resistor or small-signal control circuit. The base of the PNP triode 4 is connected to drain of another N MOS transistor through a resistor, and the gate of the N MOS transistor is connected to a status pin of the detection circuit. When the circuit operate normally, the status pin of the LED constant-current driving IC is at high voltage level, and the N MOS transistor is conductive. After the input voltage is divided by resistor, the base voltage of the PNP triode 4 is lower than the emitter voltage, which reaches the conductive condition for the PNP triode 4 so that the input voltage can supply power to the subsequent circuitry. When the LED constant-current driving IC detects an abnormal behavior and activates the protection function, the voltage on the status pin will become at low voltage level so that N MOS transistor is cut off. At this point, the voltages at the base and emitter of the PNP triode 4 are equal and the triode is unable to conduct. Therefore, the input voltage is cut off from the subsequent circuitry and the energy-consumption of the overall circuit is reduced.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A protection circuit with low energy-consumption, which comprises: a detection circuit and a switch circuit, the switch circuit being disposed between a power supply circuit and a peripheral step-down shunt; the detection circuit and the switch circuit being connected for controlling;
    wherein the switch circuit comprises a PNP triode or a P MOS transistor connected between the power supply circuit and the peripheral step-down shunt; and
    a base of the PNP triode or the P MOS transistor being connected to a drain of another N MOS transistor through a resistor, a gate of the N MOS transistor being connected to a status pin of the detection circuit.

2. The protection circuit with low energy-consumption as claimed in claim 1, wherein the detection circuit employs a driving IC.

3. The protection circuit with low energy-consumption as claimed in claim 2, wherein the driving IC is a constant-current driving IC.

4. The protection circuit with low energy-consumption as claimed in claim 3, wherein the constant-current driving IC is an LED constant-current driving IC.

5. The protection circuit with low energy-consumption as claimed in claim 1, wherein the peripheral step-down shunt is a small-signal control circuit.

6. The protection circuit with low energy-consumption as claimed in claim 5, wherein the peripheral step-down shunt further comprises inductor.

7. The protection circuit with low energy-consumption as claimed in claim 6, wherein the peripheral step-down shunt further comprises divider resistor.

8. A driving circuit, which comprises an IC, the IC being disposed with pins, the driving circuit comprising a protection circuit with low energy-consumption and further comprising a detection circuit and a switch circuit, the switch circuit being disposed between a power supply circuit and a peripheral step-down shunt; the detection circuit and the switch circuit being connected for controlling;
    wherein the switch circuit comprises a PNP triode or a P MOS transistor connected between the power supply circuit and the peripheral step-down shunt; and
    a base of the PNP triode or the P MOS transistor being connected to a drain of another N MOS transistor through a resistor, and a gate of the N MOS transistor being connected to a status pin of the detection circuit.

9. The driving circuit as claimed in claim 8, wherein the detection circuit employs a driving IC.

10. The driving circuit as claimed in claim 9, wherein the driving IC is a constant-current driving IC.

11. The driving circuit as claimed in claim 10, wherein the constant-current driving IC is an LED constant-current driving IC.

12. The driving circuit as claimed in claim 8, wherein the peripheral step-down shunt is a small-signal control circuit.

13. The driving circuit as claimed in claim 12, wherein the peripheral step-down shunt further comprises inductor.

14. The driving circuit as claimed in claim 13, wherein the peripheral step-down shunt further comprises divider resistor.

15. The driving circuit as claimed in claim 8, wherein the driving circuit is an LED driving circuit.

16. The driving circuit as claimed in claim 15, wherein the LED driving circuit is an LED backlight driving circuit.

* * * * *